United States Patent
Yu et al.

(10) Patent No.: US 8,885,366 B2
(45) Date of Patent: Nov. 11, 2014

(54) DC-TO-DC VOLTAGE REGULATOR AND ITS OPERATING METHOD THEREOF

(75) Inventors: Ming-Hung Yu, Miaoli County (TW); Yung-Fu Huang, Miaoli County (TW); Min-Ju Hsieh, Kaohsiung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 361 days.

(21) Appl. No.: 13/547,886

(22) Filed: Jul. 12, 2012

(65) Prior Publication Data

US 2013/0141949 A1 Jun. 6, 2013

(30) Foreign Application Priority Data

Dec. 6, 2011 (TW) .............................. 100144816 A (51) Int. Cl.
*H02M 3/337* (2006.01)

(52) U.S. Cl.
USPC .......................................................... 363/24

(58) Field of Classification Search
CPC ... H02M 3/337; H02M 3/3372; H02M 3/33576
USPC .............................................. 363/24, 25, 26
See application file for complete search history.

(56) References Cited

U.S. PATENT DOCUMENTS

| | | | |
|---|---|---|---|
| 6,344,979 B1 | 2/2002 | Huang et al. | |
| 7,049,712 B2 | 5/2006 | Ying et al. | |
| 7,177,163 B2 | 2/2007 | Eguchi et al. | |
| 7,573,731 B2 | 8/2009 | Kwon et al. | |
| 7,706,152 B2 | 4/2010 | Shen et al. | |
| 7,812,575 B2 | 10/2010 | Shimada et al. | |
| 2002/0167821 A1 | 11/2002 | Xing et al. | |
| 2004/0047165 A1* | 3/2004 | Luo et al. | ........................ 363/25 |
| 2004/0125619 A1 | 7/2004 | Yang et al. | |

(Continued)

FOREIGN PATENT DOCUMENTS

| | | |
|---|---|---|
| CN | 1906837 A | 1/2007 |
| TW | M329292 U | 3/2008 |
| TW | M368162 U1 | 11/2009 |
| TW | M401929 U1 | 4/2011 |

OTHER PUBLICATIONS

Chen et al., "Active-Clamping Dual Resonant Converter", IEEE International Symposium on Industrial Electronics (ISIE 2009), Jul. 5-8, 2009, pp. 1520-1525.

(Continued)

*Primary Examiner* — Harry Behm
*Assistant Examiner* — Matthew Grubb
(74) *Attorney, Agent, or Firm* — Birch, Stewart, Kolasch & Birch, LLP (57) ABSTRACT

A method for operating the DC-to-DC voltage regulator including plural active switches and plural inductors is disclosed. The method including the steps of: turning on the first active switch, and then turning off the first active switch when the current flowing in the first inductor is equal to zero; turning on the third active switch, and then turning off the third active switch when the current flowing in the second inductor is equal to zero; turning on the second active switch, and then turning off the second active switch when the current flowing in the first inductor is equal to zero; and turning on the fourth active switch, and then turning off the fourth active switch when the current flowing in the second inductor is equal to zero.

10 Claims, 7 Drawing Sheets

(56) References Cited

U.S. PATENT DOCUMENTS

| | | |
|---|---|---|
| 2005/0259451 A1* | 11/2005 | Mbaye .......................... 363/40 |
| 2005/0286270 A1 | 12/2005 | Petkov et al. |
| 2009/0016083 A1 | 1/2009 | Soldano et al. |
| 2009/0086514 A1 | 4/2009 | Fornage et al. |
| 2009/0153217 A1 | 6/2009 | Hsia et al. |
| 2009/0244929 A1 | 10/2009 | Fornage |
| 2010/0008107 A1 | 1/2010 | Mallwitz et al. |

OTHER PUBLICATIONS

Gopiyani et al., "A Novel Half-Bridge LLC Resonant Converter for High Power DC Power Supply", pp. 34-39.

Huang et al., "Series resonant type soft-switching grid-connected single-phase inverter employing discontinuous-resonant control applied to photovoltaic AC module", pp. 989-994.

Ruan et al., "Soft-Switching Techniques for PWM Full Bridge Converters", pp. 634-639.

Sato et al., "A Novel Synchronous Rectifiers Based ZVS-PWM DC-DC Power Converter with Extended Soft-Switching Operation Range", IEICE/IEEE INTELEC '03, Oct. 19-23, 2003, pp. 268-273.

Yang et al., "Integrated Magnetic for LLC Resonant Converter", pp. 346-351.

\* cited by examiner

DC-TO-DC VOLTAGE REGULATOR AND ITS OPERATING METHOD THEREOF

The present application is based on, and claims priority from, Taiwan Application Serial Number 100144816, filed 2011 Nov. 6, the disclosure of which is hereby incorporated by reference herein in its entirety

TECHNICAL FIELD

The present disclosure relates to a DC-to-DC voltage regulator, and more particularly, to an operating method for controlling the active switches in the voltage regulator.

TECHNICAL BACKGROUND

Conventionally, the voltage converting circuits can have their applications in solar energy systems, being in parallel with the household electricity, so that they have a wide range of DC voltage at the input terminals thereof. For household usage, the solar cell modules can be connected in parallel or in series to each other to supply the home appliances with electricity of proper DC voltages. However, throughput of the solar energy system can be affected once one of the solar cell modules was out of order for some how, so a DC-to-AC voltage converter was included in a solar cell module. Low-voltage power generation of the solar cell module can be transferred to an AC power by the DC-to-AC voltage converter and then in paralleled with the household electricity; thereby, reliability and efficiency of the household power supply system can be improved.

The DC-to-AC voltage converter in solar cell modules can be constructed by a DC-to-DC voltage converting circuit of high-frequency switching in the first stage and a DC-to-AC voltage converting circuit of low-frequency switching in the second stage. With regard to the DC-to-DC voltage converting circuit therein, it is based on the pulse-width-modulation (PWM) mechanism. The PWM technique to operate the DC-to-DC voltage converting circuit is of slow response and not in the soft-switching condition for all possible loading scenarios. Therefore, it is in need to develop an operating method for controlling the active switches in the DC-to-DC voltage converting circuit to improve its performance.

TECHNICAL SUMMARY

According to one aspect of the present disclosure, an embodiment provides a DC-to-DC voltage regulator having input and output terminals, the voltage regulator comprising: a push-pull DC-to-DC converting unit comprising first and second active switches and configured to convert a voltage $V_1$ at the input terminal to a square-wave signal of voltage; an isolation transformer having two primary windings and one secondary winding, wherein the primary windings are coupled to the first and second active switches, respectively; a resonant unit comprising a capacitor and first and second inductors, the first inductor coupled to the secondary winding of the isolation transformer; third and forth active switches coupled to a terminal of the second inductor; first and second rectifiers coupled to the third and forth active switches, respectively; and an output stage of full-wave rectification comprising four passive switches and a plurality of connection joints and configured to provide a voltage $V_2$ at the output terminal, wherein the connection joints are coupled to the resonant unit, the isolation transformer, and the first and second rectifiers, respectively.

According to another aspect of the present disclosure, another embodiment provides a method for operating the DC-to-DC voltage regulator according to the foregoing embodiment, the method comprising the steps of: turning on the first active switch, and then turning off the first active switch when the current flowing in the first inductor is equal to zero; turning on the third active switch, and then turning off the third active switch when the current flowing in the second inductor is equal to zero; turning on the second active switch, and then turning off the second active switch when the current flowing in the first inductor is equal to zero; and turning on the fourth active switch, and then turning off the fourth active switch when the current flowing in the second inductor is equal to zero.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following.

Figure 1:
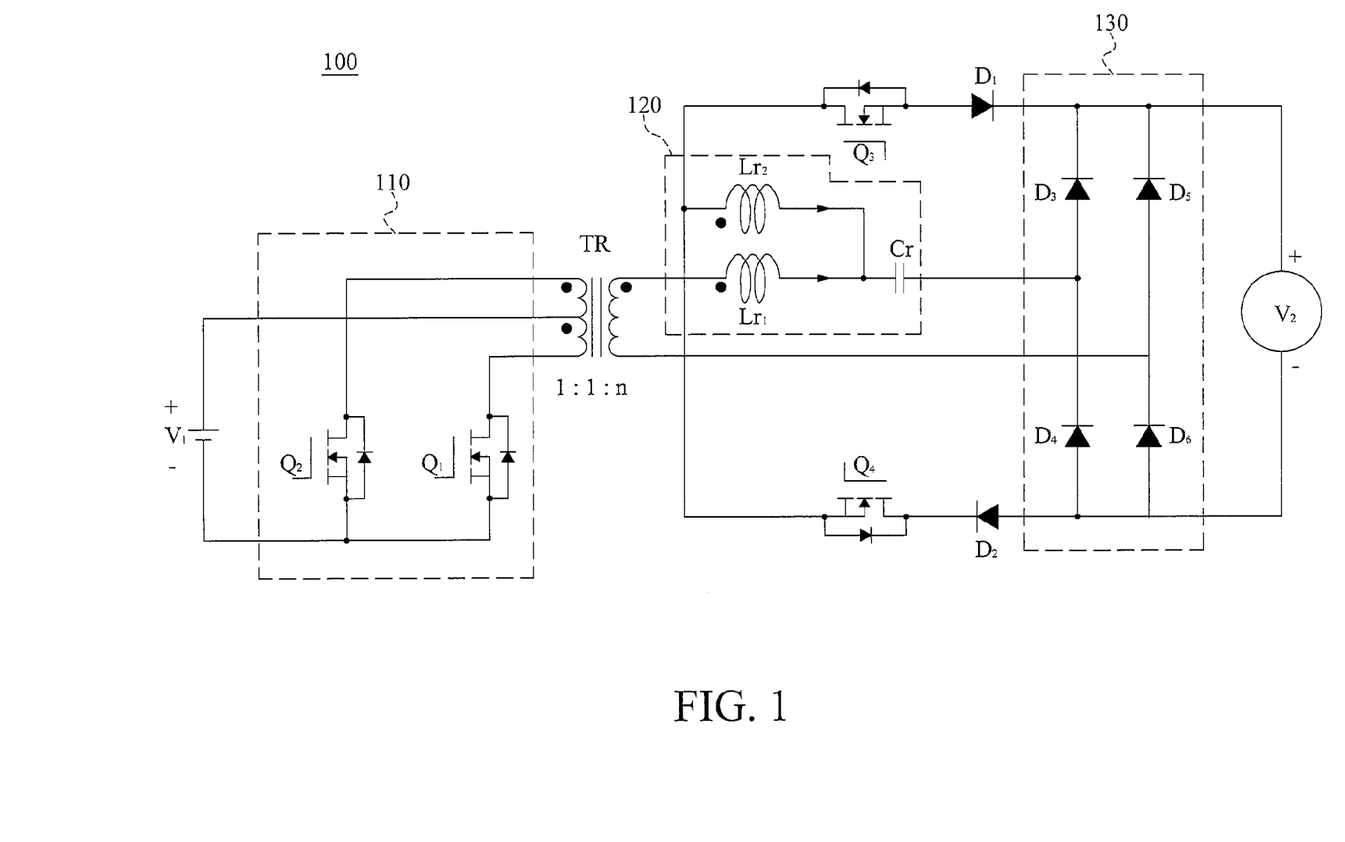
FIG. 1 shows a circuit diagram of a DC-to-DC voltage regulator according to an embodiment of the present disclosure.

FIG. 1 shows a circuit diagram of a DC-to-DC voltage regulator according to an embodiment of the present disclosure, which is also used to describe the operating method for the DC-to-DC voltage regulator. As shown in FIG. 1, the DC-to-DC voltage regulator 100 has input and output terminals and is configured to convert a DC voltage $V_1$ at the input terminals to a DC voltage $V_2$ at the output terminals. The DC-to-DC voltage regulator includes a DC-to-DC converting unit 110, an isolation transformer TR, a resonant unit 120, third and forth active switches $Q_3$ and $Q_4$, first and second rectifiers $D_1$ and $D_2$, and an output stage 130. Each element in the DC-to-DC voltage regulator 100 is going to be described below in detail.

The isolation transformer TR having a first primary winding, a second primary winding, and a secondary winding, in which the turns ratio of the first primary winding to the second primary winding is 1:1, while the turns ratio of the secondary winding to the primary winding is n:1, where n is more or less than 1. In other words, the number of turns among the windings of the isolation transformer TR is in the ratio 1:1:n, and a center tap is formed between the first and second primary windings. If n is more than 1, the isolation transformer TR can be used for stepping up the voltage; otherwise, it can be used for stepping down the voltage.

The DC-to-DC converting unit 110 can serve as an input stage of the DC-to-DC voltage regulator 100, and includes a first active switch $Q_1$ and a second active switch $Q_2$. In the embodiment, the active switches are formed of MOSFETs. The positive terminal of the input voltage $V_1$ is connected to the center tap of the primary windings in the isolation transformer TR, and its negative terminal is connected to the first and second active switches $Q_1$ and $Q_2$. The other terminal of the first active switch $Q_1$ is connected to the negative terminal of the first primary winding, while the other terminal of the second active switch $Q_2$ is connected to the positive terminal of the second primary winding. Due to the switching control of push-pull operation between the first and second active switches $Q_1$ and $Q_2$, the DC-to-DC converting unit 110 can convert the input voltage $V_1$ at the input terminals to a square-wave signal of voltage, so as to facilitate the electro-magnetically inductive coupling effect in the isolation transformer TR.

The resonant unit 120 can be composed of a capacitor $C_r$, a first inductors $L_{r1}$ and a second inductors $L_{r2}$, in which the first and second inductors $L_{r1}$ and $L_{r2}$ are connected to one of two terminals of the capacitor $C_r$, to respectively form a LC serial resonant circuit. The resonance frequencies of the LC serial resonant circuits can be used to control the operational states, "On" or "Off", of the active switches in the embodiment, which will be described later in more detail. Moreover, the first inductor $L_{r1}$ is connected to one of two terminals of the secondary winding in the isolation transformer TR.

The third and forth active switches $Q_3$ and $Q_4$ can also be implemented by MOSFETs and are connected to one of two terminals of the second inductors $L_{r2}$, as to control the current flowing in the secondary winding of the isolation transformer TR. It will be described later in more detail.

The first rectifier $D_1$ is connected to the third active switch $Q_3$, while the second rectifier $D_2$ is connected to the forth active switch $Q_4$. The first and second rectifiers can be implemented by clamping diodes, so as to clamp the current direction of the secondary winding in the isolation transformer TR. Thereby, the current can be limited to flow in only one direction to avoid fault operation of the DC-to-DC voltage regulator 100 caused by the current in the opposite direction. It will be described later in more detail.

The output stage 130 can be implemented by a full-wave rectifier circuit, which includes four passive switches $D_3/D_4/D_5/D_6$. Each two of the passive switches $D_3/D_4/D_5/D_6$ are cascaded and then the cascades are connected in parallel, forming two cascade and two parallel connection joints. As shown in FIG. 1, the passive switches $D_3$ and $D_4$ are cascaded with a cascade connection joint formed between them, the passive switches $D_5$ and $D_6$ are cascaded with another cascade connection joint formed between them, and then the two cascades are connected in parallel with two parallel connection joints formed at both sides, respectively. In other words, the connection joints of the passive switches $D_3/D_4/D_5/D_6$ include two cascade and two parallel connection joints, which are further connected to the resonant unit 120, the isolation transformer TR, and the first and second rectifiers $D_1$ and $D_2$, respectively. In the embodiment, the two cascade connection joints are connected to the other terminals of the capacitor $C_r$ and the secondary winding, respectively, while the two parallel connection joints are connected to the other terminals of the first and second rectifiers $D_1$ and $D_2$, respectively. After that, the voltage $V_2$ at the output terminals of the DC-to-DC voltage regulator 100 can be extracted from the two parallel connection joints of the output stage 130.

An appropriate method of operation can be applied to each active switch in the foregoing embodiment to realize DC-to-DC voltage conversion in a high-frequency switching mode, wherein the operating frequency is variable with a maximum of 200 KHz. By proper designation of switching frequency for the active switches and turns ratio for the isolation transformer TR, the DC voltage $V_1$ at the input terminals of the DC-to-DC voltage regulator 100 can be increased to the DC voltage $V_2$ at its output terminals. But it is not limited thereby; the DC-to-DC voltage regulator 100 can also produce a DC voltage decrease from $V_1$ to $V_2$ without limitations on its allowable voltage range. The DC-to-DC voltage regulator 100 according to the embodiment can have its applications in the DC-to-DC voltage conversion unit of high-frequency switching mode for the pre-stage of solar cell modules; but it is not limited thereby.

Figure 2:
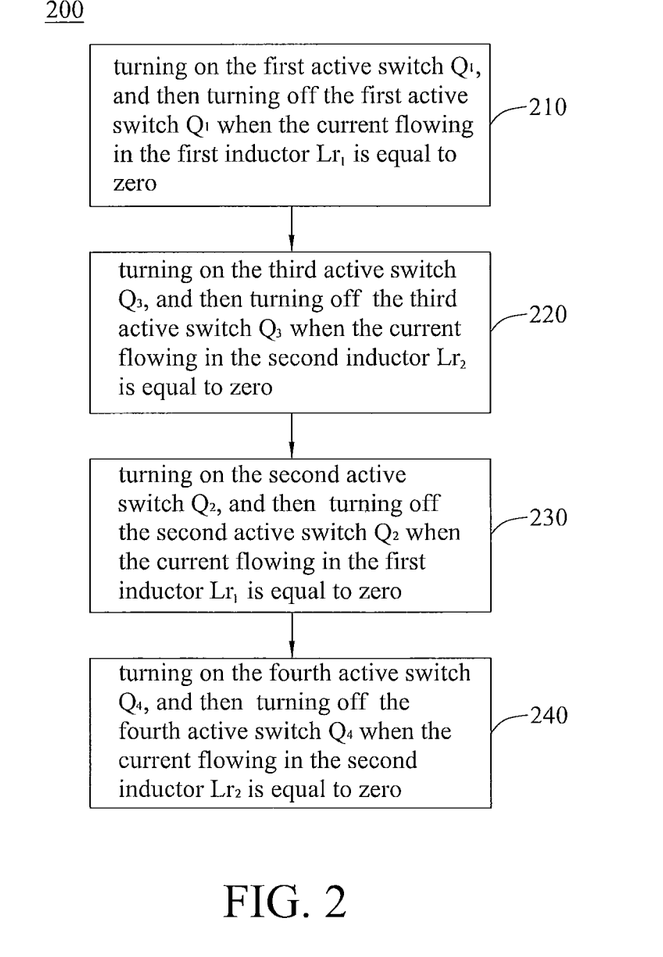
FIG. 2 shows a flowchart of the operating method for controlling the active switches in the DC-to-DC voltage converter.

Regarding the DC-to-DC voltage regulator as set forth in the previous embodiments, an operating method 200 is then provided to control the On or Off states of the active switches $Q_1/Q_2/Q_3/Q_4$ in the DC-to-DC voltage regulator 100. Please refer to FIG. 2, showing a flowchart of the operating method 200 which includes the following steps. In step 210, the first active switch $Q_1$ is turned on and kept in its On state, and then it is turned off when the current flowing in the first inductor $L_{r1}$ is equal to zero. In step 220, the third active switch $Q_3$ is turned on and kept in its On state, and then it is turned off when the current flowing in the second inductor $L_{r2}$ is equal to zero. In step 230, the second active switch $Q_2$ is turned on and kept in its On state, and then it is turned off when the current flowing in the first inductor $L_{r1}$ is equal to zero. In step 240, the forth active switch $Q_4$ is turned on and kept in its On state, and then it is turned off when the current flowing in the second inductor $L_{r2}$ is equal to zero. The steps are going to be described in more detail.

Figure 3:
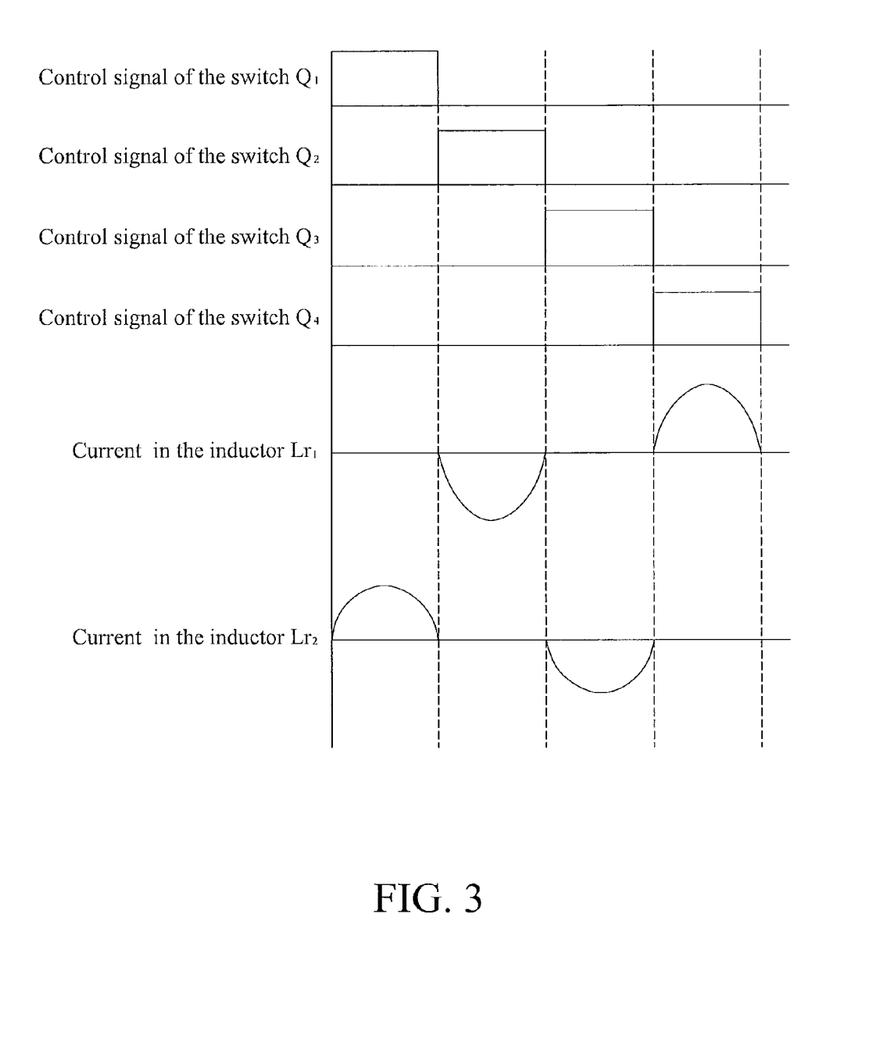
FIG. 3 plots the control signals of the active switches $Q_1/Q_2/Q_3/Q_4$ and the flowing currents of the first and second inductors $L_{r1}$ and $L_{r2}$ in the operating method.

FIG. 3 plots the control signals of the active switches $Q_1/Q_2/Q_3/Q_4$ and the flowing currents of the first and second inductors $L_{r1}$ and $L_{r2}$ in the operating method 200. In order to facilitate knowing the operation of the DC-to-DC voltage regulator 100 according to the operating method 200 in the embodiment, all the active switches $Q_1/Q_2/Q_3/Q_4$ can be turned off and then the steps 210, 220, 230 and 240 proceed in sequence.

Figure 4A:
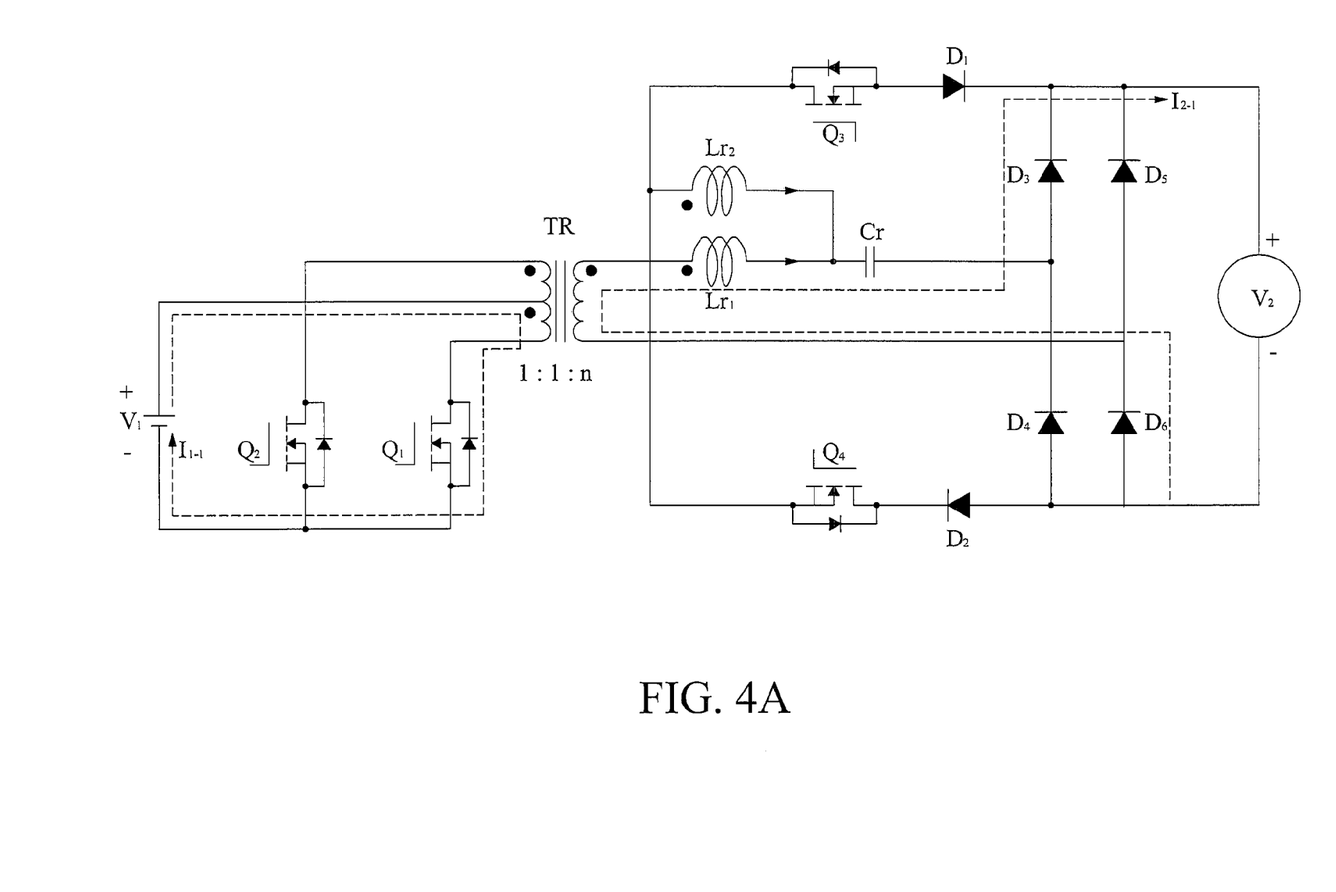
FIG. 4A shows the current path in the DC-to-DC voltage regulator in the dashed line in the step 210.

Of all the active switches $Q_1/Q_2/Q_3/Q_4$, only the first active switches $Q_1$ is turned on in the first step 210, so that the current path flowing in the DC-to-DC voltage regulator 100 can be illustrated as the dashed line in FIG. 4A. Due to the On state of the first active switch $Q_1$, the current $I_{1-1}$ can be conducted to flow into the isolation transformer TR through the positive terminal of the first primary winding, and then its secondary-winding current $I_{2-1}$ can be produced according to the electro-magnetically inductive coupling effects in the transformer. The current $I_{2-1}$ may follow along the path of the first inductor $L_{r1}$, the capacitor $C_r$ and the passive switches $D_3$. With the closed state of the passive switches $D_6$, the DC-to-DC voltage regulator 100 can output the DC voltage $V_2$ at its output terminals. The capacitor $C_r$ can be charged to store electrical energy due to the current $I_{2-1}$. The current $I_{2-1}$ may increase and then decrease sinusoidally, in accordance with the current curve of the first inductor $L_{r1}$ as shown in FIG. 3. Once the current $I_{2-1}$ or the current flowing in the first inductor $L_{r1}$ is equal to zero, the first active switch $Q_1$ can be turned off so as to proceed to the next step of switching the active switches in sequence.

Figure 4B:
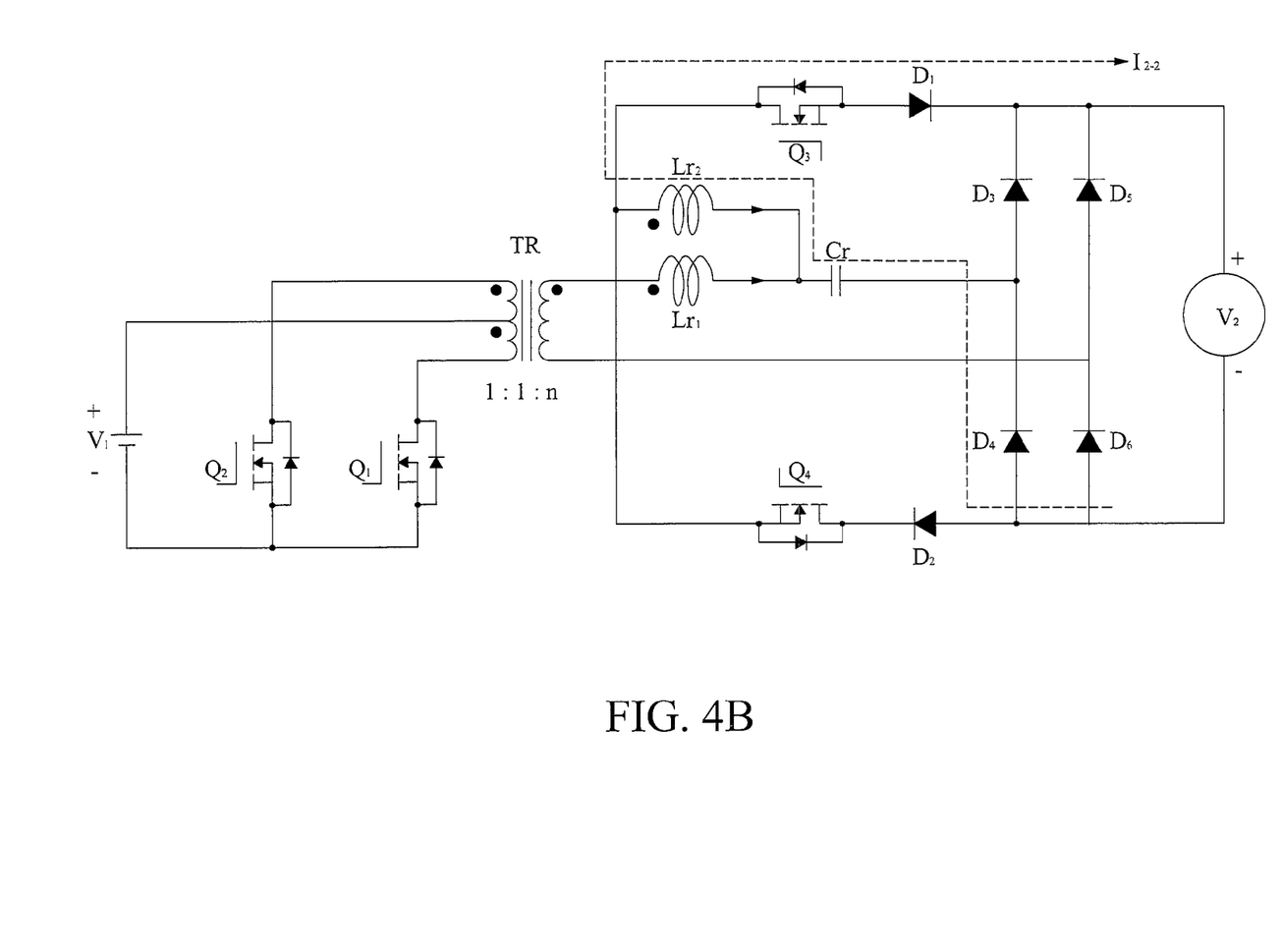
FIG. 4B shows the current path in the DC-to-DC voltage regulator in the dashed line in the step 220.

In the next step 220, the third active switches $Q_3$ is turned on so that the current path flowing in the DC-to-DC voltage regulator 100 can be illustrated as the dashed line in FIG. 4B. Due to the On state of the third active switches $Q_3$, the energy stored in the capacitor $C_r$ can be discharged to form the new current $I_{2-2}$, which flow along the path of the second inductor $L_{r2}$, the third active switches $Q_3$ and the first rectifier $D_1$. With the closed state of the passive switches $D_4$, the DC-to-DC voltage regulator 100 can output the DC voltage $V_2$ at its output terminals. The current $I_{2-2}$ may increase and then decrease sinusoidally, in accordance with the current curve of the second inductor $L_{r2}$ as shown in FIG. 3. Once the current $I_{2-2}$ or the current flowing in the second inductor $L_{r2}$ is equal to zero, the third active switches $Q_3$ can be turned off so as to proceed to the next step of switching the active switches in sequence.

Figure 4C:
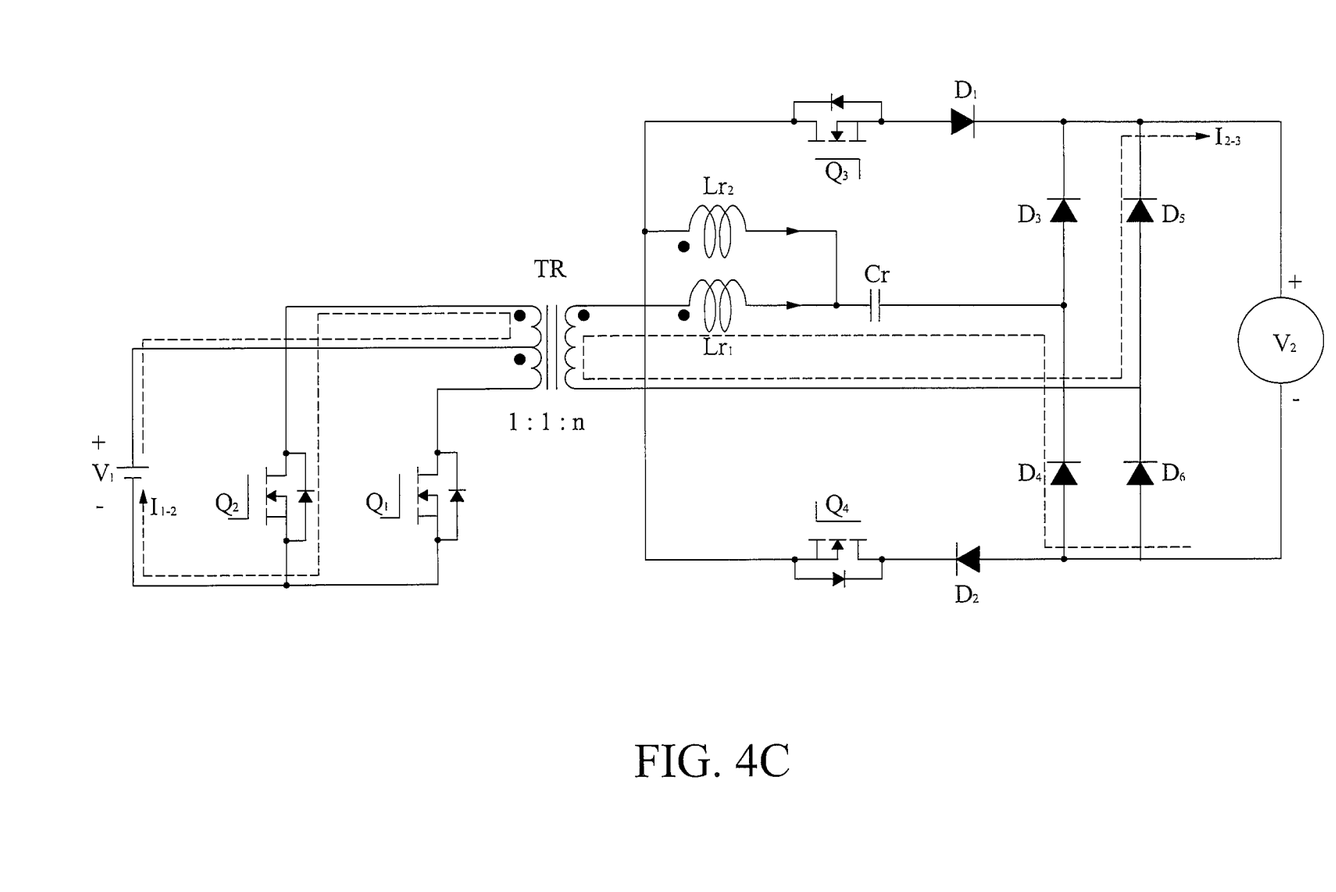
FIG. 4C shows the current path in the DC-to-DC voltage regulator in the dashed line in the step 230.

In the next step 230, the second active switches $Q_2$ is turned on so that the current path flowing in the DC-to-DC voltage regulator 100 can be illustrated as the dashed line in FIG. 4C. Due to the On state of the second active switches $Q_2$, the current $I_{1-2}$ can be conducted to flow into the isolation transformer TR through the negative terminal of the second primary winding, and then its secondary-winding current $I_{2-3}$ can be produced according to the electro-magnetically inductive coupling effects in the transformer. The current $I_{2-3}$ may follow along the path of the passive switches $D_4$, the capacitor $C_r$, the first inductor $L_{r1}$ and the passive switches $D_5$, so that the DC-to-DC voltage regulator 100 can output the DC voltage $V_2$ at its output terminals. Again, the capacitor $C_r$ can be charged to accumulate electrical energy due to the current $I_{2-3}$. The current $I_{2-3}$ may increase and then decrease sinusoidally, in accordance with the current curve of the first inductor $L_{r1}$ as shown in FIG. 3. Once the current $I_{2-3}$ or the current flowing in the first inductor $L_{r1}$ is equal to zero, the second active switches $Q_2$ can be turned off so as to proceed to the next step of switching the active switches in sequence.

Figure 4D:
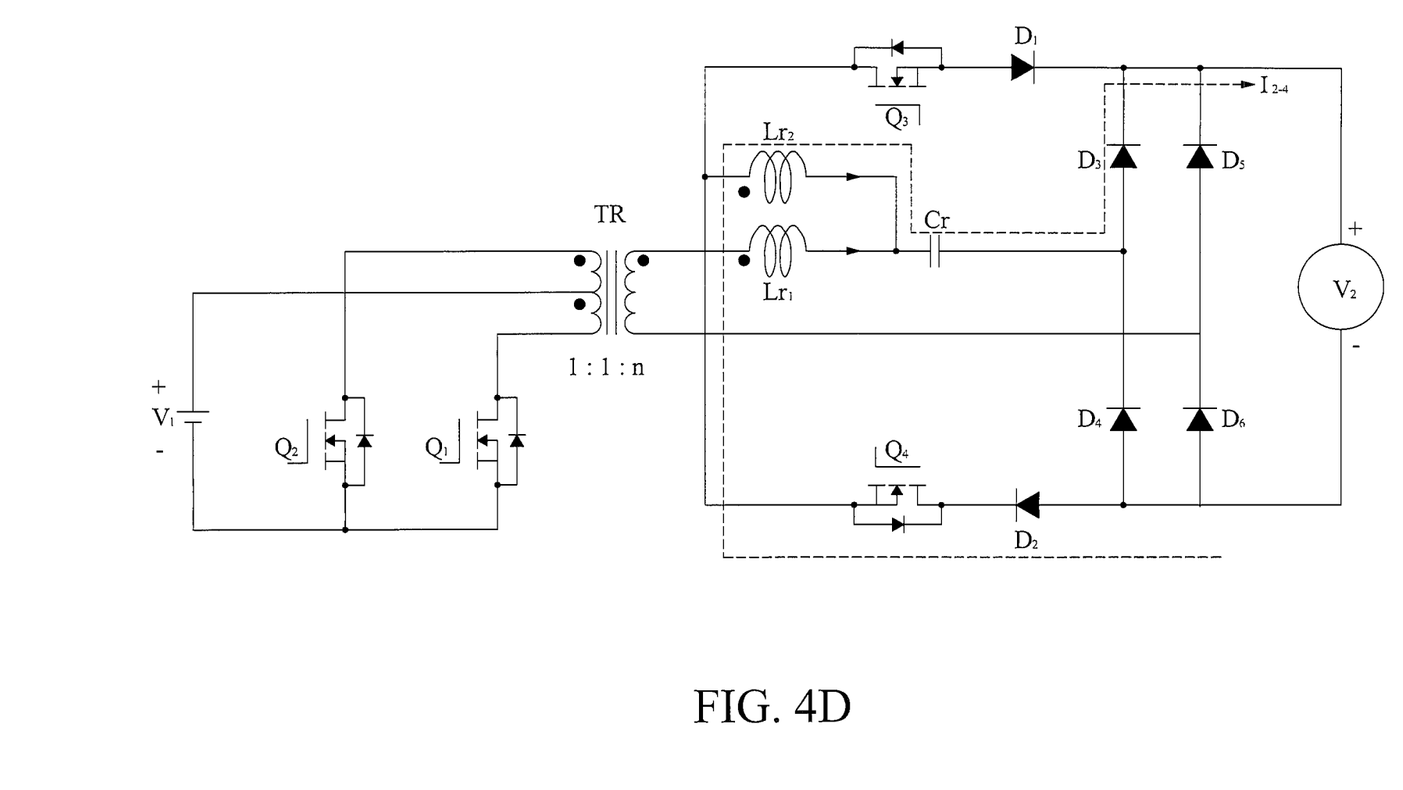
FIG. 4D shows the current path in the DC-to-DC voltage regulator in the dashed line in the step 240.

In the next step 240, the forth active switches $Q_4$ is turned on so that the current path flowing in the DC-to-DC voltage regulator 100 can be illustrated as the dashed line in FIG. 4D. Due to the On state of the forth active switches $Q_4$, the energy stored in the capacitor $C_r$ can be discharged to form the new current $I_{2-4}$, which flow along the path of the second rectifiers $D_2$, the forth active switches $Q_4$, the second inductor $L_{r2}$, the capacitor $C_r$ and the passive switches $D_3$, so that the DC-to-DC voltage regulator 100 can output the DC voltage $V_2$ at its output terminals. The current $I_{2-4}$ may increase and then decrease sinusoidally, in accordance with the current curve of the second inductor $L_{r2}$ as shown in FIG. 3. Once the current $I_{2-4}$ or the current flowing in the second inductor $L_{r2}$ is equal to zero, the forth active switches $Q_4$ can be turned off so as to be ready for the next cycle of switching the active switches in sequence.

In the embodiment, the active switches $Q_1/Q_2/Q_3/Q_4$ can be operated according to the control signals in FIG. 3, respectively. The On-state duration of each active switch $Q_1/Q_2/Q_3/Q_4$ is based on its corresponding resonance frequency of the resonant unit 120. When the resonance current in the resonant unit 120 is equal to zero, the active switch at the primary-winding side of the isolation transformer TR is turned off and the active switch at its secondary-winding side can be turned on and kept for a proper On-state duration; thereby, the switching loss happened in the Off state of the active switches can be minimized. Moreover, the resonant unit 120 is disposed at the secondary-winding side of the isolation transformer TR with a higher voltage than its primary-winding side, so the operating loss happened in the On state of the active switches can be lowered. Consequently, such kind of voltage converting unit can have improved conversion efficiency.

It can be inevitable for an active switch to have energy lost in its switching operation, such as switching loss and turning-on loss. However, in the embodiments according to the present disclosure, only one of the active switches in the DC-to-DC voltage regulator 100 can be switched on and stay in the On state at every single time. As to the conventional full-bridge DC-to-DC voltage regulators, at least two active switches are switched and stay in the On state at every single time. Therefore, it may be of low-loss advantage for the DC-to-DC voltage regulators according to the embodiments.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A DC-to-DC voltage regulator having input and output terminals, the voltage regulator comprising:
   a push-pull DC-to-DC converting unit comprising first active switch and second active switch and configured to convert a voltage $V_1$ at the input terminal to a square-wave signal of voltage;
   an isolation transformer having two primary windings and one secondary winding, wherein the primary windings are coupled to the first and second active switches, respectively;
   a resonant unit comprising a capacitor and first inductor and second inductor, the first inductor coupled to the secondary winding of the isolation transformer;
   third active switch and fourth active switch coupled to a terminal of the second inductor;
   first rectifier and second rectifier coupled to the third active switch and fourth active switch, respectively; and
   an output stage of full-wave rectification comprising four passive switches and a plurality of connection joints and configured to provide a voltage $V_2$ at the output terminal, wherein the connection joints are coupled to the resonant unit, the isolation transformer, and the first and second rectifiers, respectively.

2. The DC-to-DC voltage regulator of claim 1, wherein the turns ratio of the two primary windings is 1, while the turns ratio of the secondary winding to the primary winding is more than 1 in the isolation transformer.

3. The DC-to-DC voltage regulator of claim 1, wherein the first and second inductors are coupled to a terminal of the capacitor, and each two of the passive switches are cascaded and the cascades are connected in parallel, forming two cascade and two parallel connection joints, wherein the two cascade connection joints are coupled to the other terminals of the capacitor and the secondary winding, respectively, and the two parallel connection joints are coupled to the other terminals of the first and second rectifiers, respectively.

4. The DC-to-DC voltage regulator of claim 1, wherein the first rectifier comprises a first clamping diode and the second rectifier comprises a second clamping diode.

5. A method for operating the DC-to-DC voltage regulator of claim 1, the method comprising the steps of:
- (A) turning on the first active switch, and then turning off the first active switch when the current flowing in the first inductor is equal to zero;
- (B) turning on the third active switch, and then turning off the third active switch when the current flowing in the second inductor is equal to zero;
- (C) turning on the second active switch, and then turning off the second active switch when the current flowing in the first inductor is equal to zero; and
- (D) turning on the fourth active switch, and then turning off the fourth active switch when the current flowing in the second inductor is equal to zero.

6. The method of claim 5, wherein the steps of (A), (B), (C) and (D) are taken in the alphabetical sequence.

7. The method of claim 6, wherein all the active switches are turned off before the step (A) is initiated.

8. A method for operating the DC-to-DC voltage regulator of claim 3, the method comprising the steps of:
- (A) turning on the first active switch, and then turning off the first active switch when the current flowing in the first inductor is equal to zero;
- (B) turning on the third active switch, and then turning off the third active switch when the current flowing in the second inductor is equal to zero;
- (C) turning on the second active switch, and then turning off the second active switch when the current flowing in the first inductor is equal to zero; and
- (D) turning on the fourth active switch, and then turning off the fourth active switch when the current flowing in the second inductor is equal to zero.

9. The method of claim 8, wherein the steps of (A), (B), (C) and (D) are taken in the alphabetical sequence.

10. The method of claim 9, wherein all the active switches are turned off before the step (A) is initiated.

* * * * *